United States Patent Office 3,123,059
Patented Mar. 3, 1964

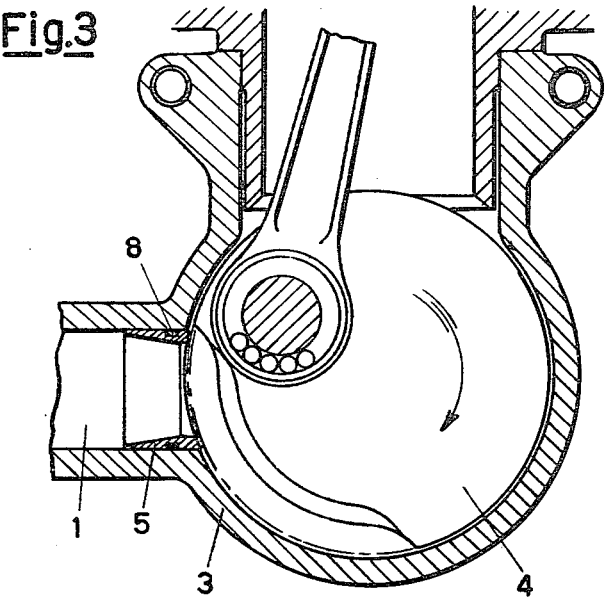
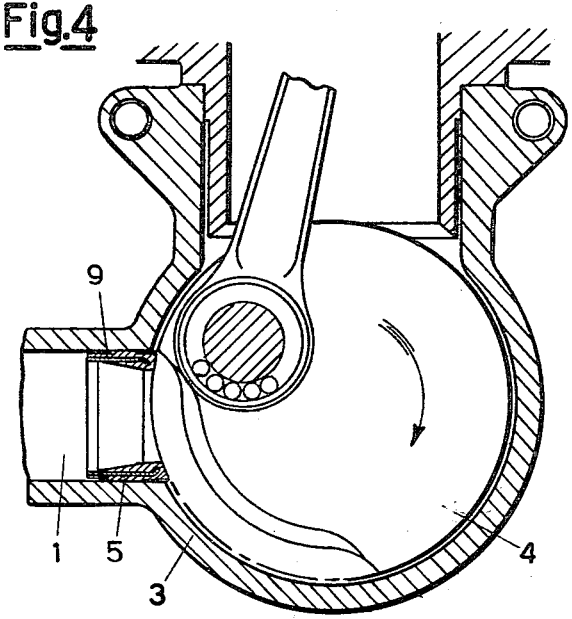

3,123,059
TWO-STROKE-CYCLE ENGINE WITH AN ADMISSION PORT IN THE CRANKCASE AT THE PERIPHERY OF THE CRANKS OF THE DRIVE SHAFT
Vittorio Casini, Pisa, Italy, assignor to Piaggio & C., S.p.A., Genoa, Italy, a company of Italy
Filed May 1, 1961, Ser. No. 107,622
Claims priority, application Italy May 1, 1960
2 Claims. (Cl. 123—73)

The present invention relates to improvements in two-stroke-cycle engines.

More particularly, the present invention relates to improvements of two-stroke-cycle engines having admission ports provided in the crankcase at the periphery of the cranks of the drive shaft, according to my U.S. Patent No. 2,946,324.

The improved engine is characterized in that the admission conduit is terminated by a bush surrounding the admission port, said bush being removable and fixed to the said crankcase at minimum distance from the periphery of said cranks, in such a way as to provide sealing between the admission conduit and the precompression chamber in the crankcase.

The bush provided according to the improvements contemplated herein not only affords the advantage of directing the stream of air and combustible mixture (petrol plus lubricating oil) towards the area surrounding the crankpin for efficiently lubricating it but also provides a considerable improvement of the continuity of the oil layer or film aforementioned.

As a matter of fact, the portion of the bush which projects towards the interior of the compression chamber acts in such a way as to provide an accumulation of oil in the neighborhood of its uppermost or lowermost generating line, according to the sense of rotation of the crank discs, so that there is the absolute certainty that, due to this slight excess of oil, the continuity of the oil layer or film is never impaired in any wise.

In addition, the oil layer formed over the edge of the bush is thinner than that filling the remainder of the peripheral space between the crank discs or discs and the crankcase: by so doing, the self-sustaining properties of the oil layer in the region surrounding the intake port are noticeably improved. The immediate consequence of these facts is that the oil layer or film has an improved stability, i.e. is less likely to be broken or ruptured, with respect to that which occurred with the arrangement described in previous Patent 2,946,324.

The following advantages are also obtained according to the invention while none of the advantages of the engine of said patent are affected.

(a) Elimination of the necessity of machining the crankcase at the seats of the crank valves and of providing couplings between the drive shaft and the crankcase, since the interstice wherein is formed the oil film necessary for the sealing between the surface of the crank valves and the respective seat, constituted by the edges of the bush, can be adjusted at the time of introduction of said bush into the admission conduit of the crankcase after having entirely assembled the engine.

(b) Easiness and economy of restoration of the sealing surfaces of the valve after the latter may break down from accidental causes (such as scoring due to abnormal deformation of the drive shaft or penetration into the crankcase of foreign bodies) by means of turning of the crank valves and replacement of the bush.

(c) Possibility of constructing the sealing surface of the seat of the crank valves of antifriction elastic material in order to avoid possible damage to the sealing surfaces in case of excessive elastic deformations of the drive shaft as a consequence of operation of the engine beyond the range of normal employment.

The invention is diagrammatically represented, by way of example to make it more fully understood and merely by way of example, in the figures in the accompanying drawings, wherein:

FIGURES 3 and 4 show two respectively further embodiments of a bush in the admission conduit of the engine.

Figure 1:
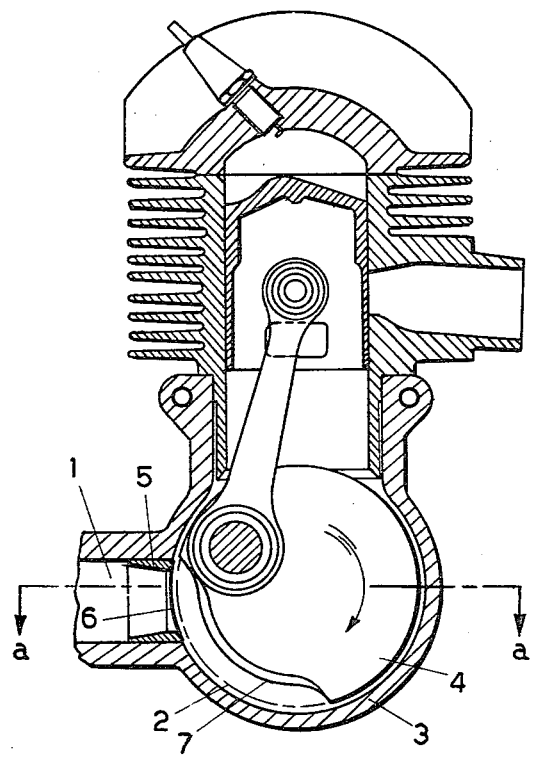
FIGURE 1 shows a diagrammatic view in section taken along a plane normal to the axis of the cylinder and of the admission conduit.
Figure 2:
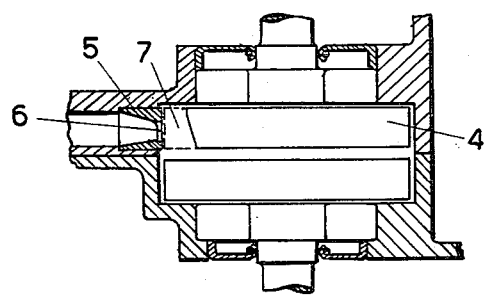
FIGURE 2 shows a section taken along line a—a in FIG. 1.

As seen in the drawing, the admission conduit 1 opens into the precompression chamber 2 of the crankcase 3 at the periphery of the crank 4. A bush 5 is provided in the conduit 1 and defines a port or opening 6 in communication with the chamber 2. The bush 5 projects into the interior of the chamber 2 relative to the internal surface of the crankcase 3 a suitable distance which is a minimum, consistent with the operating conditions of the engine, with respect to the peripheral surface of the crank 4 when the admission port 6 is closed, i.e., when the notch 7 is out of register with port 6.

In said condition the oil contained in the feed mixture and separated from the gasoline by evaporation of the latter and by centrifugation by action of the cranks, creates in the interspace between the bush 5 and the crank 4 a film which is suitable to ensure sealing between the crankcase and the admission conduit.

In the embodiment shown in FIGURE 3 the bush 5 is made of bronze or other suitable antifriction material, and is kept in position by engagement of the elastic ring 8 with the crankcase.

In FIGURE 4 the bush 5 is constituted of rubber, which is reinforced by embedded metallic member 9. The bush 5 in FIG. 4 is assembled by being force fit into its seat in the crankcase.

It should be understood that the above description and the accompanying drawings constitute but a diagrammatical form and are merely by way of example since the structure of the invention may vary in shape without departing from the spirit of the invention.

I claim:

1. In a two-stroke-cycle engine of the type having a conduit connecting a source of fuel and lubricant with a crankcase and wherein the latter is provided a rotatably supported crank disc having a periphery cooperating with the crankcase to define an annular chamber which is adapted to accommodate lubricant to form a seal between the disc and the crankcase, the disc having a recess in said periphery for conveying fuel and lubricant towards a cylinder, the improvement comprising a bush removably supported in said conduit and in part projecting from said conduit into the crankcase a distance to leave the bush spaced from the periphery of the disc outside of said recess, said bush having an opening constituting a port for admission of fuel and lubricant into said crankcase when said recess is in registry with said opening, said bush being cooperatively associated with the periphery of the disc to maintain the seal between the disc and the crankcase.

2. In a two-stroke-cycle engine of the type having a cylinder, a piston in said cylinder, a crankcase connected to said cylinder and opening into the same, a source of fuel and lubricant connected to said crankcase and opening into the latter, a rotatable crank disc in said crankcase, the periphery of said disc cooperating with the crankcase to define an annular chamber, said annular chamber being adapted to accommodate lubricant to form a seal between the disc and crankcase, said disc having a recess in its periphery for conveying said fuel and lubricant towards said cylinder, a crank pin eccentrically mounted on said disc adjacent the recess and adapted to be cooled by said fuel and lubricant, and a piston rod coupling said pin to said piston, said source opening tangentially through a conduit into said annular chamber in the direction of rotation of said disc, the improvement comprising a bush removably supported in said conduit and projecting therefrom into said chamber formed between the disc and the crankcase, said bush having an opening constituting a port for admission of fuel and lubricant into said crankcase, said bush projecting a distance which is less than the radial extent of the annular chamber whereby said bush is spaced from the periphery of the disc, said distance of projection of the bush being effective to improve direction of the fuel and lubricant into said recess while maintaining the seal between the disc and the crankcase.

References Cited in the file of this patent

UNITED STATES PATENTS

| | | |
|---|---|---|
| 1,593,988 | Porter | July 27, 1926 |
| 1,649,486 | Porter | Nov. 15, 1927 |
| 1,880,745 | Boukard | Oct. 4, 1932 |
| 2,297,161 | Newton | Sept. 29, 1942 |
| 2,711,302 | McWhorter | June 21, 1955 |
| 2,728,551 | Blackman | Dec. 27, 1955 |
| 2,946,324 | Casini | July 26, 1960 |

FOREIGN PATENTS

| | | |
|---|---|---|
| 560,515 | Italy | Apr. 6, 1957 |